United States Patent [19]

Jarvis

[11] 4,345,676
[45] Aug. 24, 1982

[54] FRICTION CLUTCH DRIVEN PLATES

[75] Inventor: Roger P. Jarvis, Leamington Spa, England

[73] Assignee: Automotive Products Limited, Leamington Spa, England

[21] Appl. No.: 135,093

[22] Filed: Mar. 28, 1980

[30] Foreign Application Priority Data

Apr. 4, 1979 [GB] United Kingdom ............. 7911750

[51] Int. Cl.³ .............................................. F16D 13/64
[52] U.S. Cl. ............................ 192/107 C; 192/107 R
[58] Field of Search ............ 192/70.14, 107 R, 107 C, 192/113 A, 109 B; 188/259, 218 XL

[56] References Cited

U.S. PATENT DOCUMENTS

| | | | |
|---|---|---|---|
| 2,096,587 | 10/1937 | Katcher | 192/107 C |
| 2,117,728 | 5/1938 | Katcher | 192/107 C |
| 2,222,507 | 11/1940 | Hunt | 192/107 C |
| 2,256,709 | 9/1941 | Geyer | 192/107 C |
| 2,256,713 | 9/1941 | Hunt | 192/107 C |
| 2,277,603 | 3/1942 | Nutt et al. | 192/107 C |
| 2,321,821 | 6/1943 | Katcher | 192/107 C |
| 2,327,884 | 8/1943 | Goodwin | 192/107 C |
| 2,333,308 | 11/1943 | Goodwin | 192/107 C |
| 2,667,948 | 2/1954 | Tilden | 188/259 X |

FOREIGN PATENT DOCUMENTS 1202904  8/1970  United Kingdom ......... 188/218 XL

*Primary Examiner*—Rodney H. Bonck
*Attorney, Agent, or Firm*—Kemon & Estabrook

[57] ABSTRACT

A friction clutch driven plate has an annular friction facing with a back surface in contact with an opposed surface of a friction facing carrier.

Circumferentially spaced recesses are provided in the back face of the facing so as to relieve the back surface of the facing to allow portions of the friction surface of the facing to yield under axial load on engagement of the driven plate against a drive member.

8 Claims, 3 Drawing Figures

FRICTION CLUTCH DRIVEN PLATES

This invention relates to friction clutch driven plates particularly for but not exclusively for motor vehicles.

Driven plates having no axial cushioning between opposed friction surfaces, which are presented as opposed friction surfaces of a facing moulded directly onto a metallic carrier plate are well known and were in common usage during the 1920's. Examples of such driven plates are shown in British Pat. No. 322,876 and British Pat. No. 321,137. A problem encountered with driven plates having no axial cushioning between the opposed friction surfaces of the facing is that this lack of cushioning gives rise to heat spotting. Heat spotting is caused by the rubbing of the driven plate friction surfaces over the high spots on the pressure plate and flywheel between which the driven plate is gripped. This heat spotting can cause a rapid breakdown in the friction material. This problem has been side stepped by placing circumferentially arranged spring steel cushioning segments between a pair of back-to-back annular friction facings mainly to prevent snatching on engagement of a vehicle clutch. The spring steel cushioning segments providing the necessary axial cushioning and allow slight flexing of the friction facing to prevent heat spotting. However, such cushioning segments are relatively expensive.

It is the object of the present invention to provide a clutch driven plate having no spring steel segments but which has the necessary built in flexibility to prevent heat spotting.

Accordingly there is provided a friction clutch driven plate having an annular friction facing with a back face in contact with an opposed surface of a friction facing carrier, wherein circumferentially spaced recesses are provided axially between the friction surface portion of the facing and the carrier so that such portions can yield under axial pressure to give an axial flexing engagement of the driven plate against a drive member.

Preferably the recesses are provided in the opposed adjacent surfaces of the facing and the carrier to relieve the back surface of the facing.

Preferably the recesses are radial sectors that extend the full radial width of the facing, and which are formed in the back surface of the facing secured to the carrier.

Such recesses may be conveniently formed by moulding the friction facings directly onto the carrier and simultaneously moulding the recesses therein. Where the recesses are embedded within the material thickness they may be conveniently formed by radially retractable inserts that can be withdrawn from the facing after moulding.

The invention will be described by way of example and with reference to the accompanying drawings in which.

Figure 1:
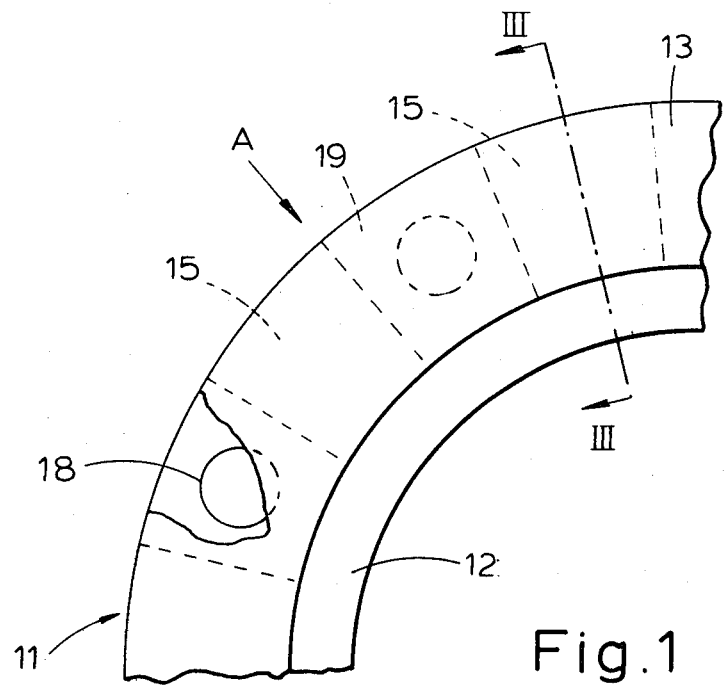
FIG. 1 shows an elevation of a quadrant of a driven plate with a portion of the facing removed.
Figure 2:
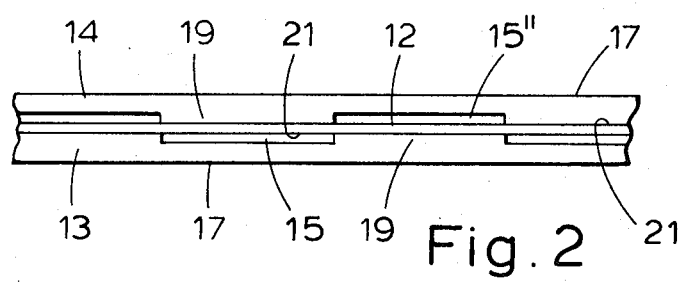
FIG. 2 is a view in the direction of arrow A of the driven plate shown in FIG. 1.
Figure 3:
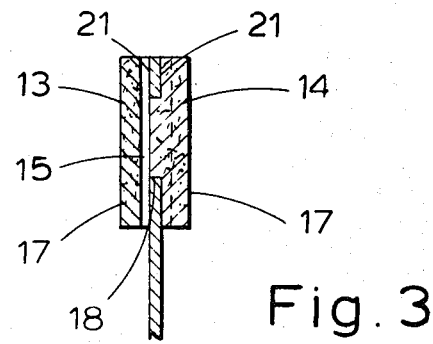
FIG. 3 is a section on the line III—III of FIG. 1.

With reference to FIGS. 1 to 3 the driven plate 11 comprises a rigid annular friction facing carrier or support plate 12 having two annular friction facings 13 and 14 secured one on each side of the carrier 12 to present opposed friction surfaces 17 that in use engage between a pair of driving member surfaces e.g. a flywheel and a pressure plate.

Each friction facing 13, or 14 has respective spaced recesses 15 provided in the back surface 21 of the facing secured to the carrier. These recesses 15 are circumferentially evenly distributed around their respective facing 13 or 14 and each recess 15 is a sector in the facing that extends the full radial width of the facing in which it is located. The angular width of the sectors is substantially equal to the angular width of the lands 19 between the recesses. These lands 19 provide direct support for the back faces 21 of the friction facings 13 and 14 which are secured back-to-back one on each side of the carrier 12. The recesses 15 in one facing 14 on one side of the carrier 12 alternate circumferentially with the recesses 15" in the other facing 14 on the other side of the carrier 12.

It has been found that sectors of 18° are ideal for the recesses on each side of the carrier and in FIG. 1 there is no angular overlap between the sectors on one side and those on the other. A depth of recess of between $\frac{1}{4}$ mm and 1 mm will be necessary. However, this depth can vary dependant upon the stiffness of the friction material from which the facing is made.

When the driven plate is subjected to an axial load (axial with respect to its axis of rotation) between a flywheel and a pressure plate of a vehicle friction clutch, the air gaps provided by the recesses 15 and 15" allow the friction facings 13 and 14 to flex axially sufficiently to allow the friction surfaces 17 to conform to surface irregularities of the flywheel and pressure plate. This flexing provides the necessary axial cushioning effect so that the problem of heat spotting is reduced to a minimum.

The two friction facings 13 and 14 can each be preformed with the respective recesses 15 and 15" either moulded or machined in the back surface thereof. The facings are then secured to the carrier 12 by means of an adhesive.

Alternatively each friction facing 13 or 14 can be moulded directly onto the carrier 12. Holes 18 are provided in the carrier 12 for keying the facings thereto; and the recesses in the back face of each facing 13 or 14 are formed during the moulding operation by the use of removeable inserts which are withdrawn from the moulded facings after the moulding operation.

It is obvious that the recesses 15 and 15" could actually be embedded within the thickness of each respective lining rather than be located in the back surface although this would require more sophisticated moulding techniques.

The recesses 15 and 15" can be arranged so that there is a small amount of circumferential overlap between the recesses 15 on one side and the recesses 15" on the other side.

I claim:

1. A friction clutch driven plate comprising:
   an annular friction facing having a friction surface and a back face;
   a rigid annular support plate having an opposed annular surface in contact with said back face; and
   circumferentially spaced recesses are provided in the opposed adjacent surfaces of the facing and the support plate to relieve the back face of the facing so as to allow the friction surface portions of the facing to yield under axial load on engagement of the driven plate against a drive member.

2. A clutch driven plate as claimed in claim 1, wherein the recesses are in the form of sectors which extend the full radial width of the facing.

3. A driven plate as claimed in claim 2, wherein the sectors occupied by the recesses are substantially equal to the sectors occupied by the lands between the recesses.

4. A driven plate as claimed in claim 3, wherein the recesses are formed in the back surface of the facing secured to the carrier.

5. A driven plate as claimed in claim 4, wherein there are two friction facings secured one on each side of an annular carrier and the recesses relieving one facing on one side of the carrier are arranged to alternate circumferentially with the recesses relieving the other facing on the other side of the carrier.

6. A driven plate as claimed in claim 5, wherein there are ten recesses relieving each friction facing.

7. A driven plate as claimed in claim 1, wherein the friction material, out of which the facing is formed, is moulded onto the carrier.

8. A driven plate as claimed in claim 1, wherein the facings are secured by adhesive to the carrier.

* * * * *